(12) United States Patent
Davies et al.

(10) Patent No.: US 10,843,881 B2
(45) Date of Patent: Nov. 24, 2020

(54) BULK LOADER SYSTEM FOR THERMOPLASTIC PELLETS

(71) Applicant: Ennis-Flint, Inc., Greensboro, NC (US)

(72) Inventors: Christopher Davies, Plymouth Meeting, PA (US); Kevin Goforth, Chester Springs, PA (US); Douglas D. Dolinar, Doylestown, PA (US); Bruce W. Gouldey, Elroy, PA (US)

(73) Assignee: Ennis-Flint, Inc., Greensboro, NC (US)

( * ) Notice: Subject to any disclaimer, the term of this patent is extended or adjusted under 35 U.S.C. 154(b) by 0 days.

(21) Appl. No.: 16/752,235

(22) Filed: Jan. 24, 2020

(65) Prior Publication Data

US 2020/0156885 A1   May 21, 2020

Related U.S. Application Data

(63) Continuation of application No. 15/830,445, filed on Dec. 4, 2017, now Pat. No. 10,625,957.

(60) Provisional application No. 62/430,467, filed on Dec. 6, 2016.

(51) Int. Cl.
| | | |
|---|---|---|
| *B65G 65/38* | (2006.01) | |
| *B65D 88/32* | (2006.01) | |
| *B65D 88/30* | (2006.01) | |
| *B65D 88/54* | (2006.01) | |
| *B65G 65/22* | (2006.01) | |
| *B65G 65/46* | (2006.01) | |

(52) U.S. Cl.
CPC ............ *B65G 65/38* (2013.01); *B65D 88/30* (2013.01); *B65D 88/32* (2013.01); *B65D 88/546* (2013.01); *B65G 65/22* (2013.01); *B65G 65/463* (2013.01); *B65G 2201/04* (2013.01); *B65G 2814/0326* (2013.01)

(58) Field of Classification Search
CPC ...... B65G 65/36; B65G 65/46; B65G 65/463; B65G 65/466
USPC .......................................................... 198/311
See application file for complete search history.

(56) References Cited

U.S. PATENT DOCUMENTS

| | | | | |
|---|---|---|---|---|
| 4,168,942 | A * | 9/1979 | Firth ..................... | B29C 48/845 425/144 |
| 7,967,546 | B2 * | 6/2011 | Pfeiffer ..................... | B66F 9/18 414/607 |
| 2010/0021277 | A1 * | 1/2010 | Fritz ........................ | B60P 1/40 414/523 |

* cited by examiner

*Primary Examiner* — Gene O Crawford
*Assistant Examiner* — Lester Ill Rushin
(74) *Attorney, Agent, or Firm* — Kilpatrick Townsend & Stockton LLP (57) ABSTRACT

A bulk loader system is disclosed that may include a conveyor unit in connection with a fuel-powered engine powering a hydraulic motor. The hydraulic motor may be used to operate the conveyor unit. The system may be configured to function while being mounted on a bed of a truck or be operated as a stand-alone unit. The unit may be sized such that an operator can stand on the deck of the truck along with the unit. The fuel-hydraulic powered motor can enable the conveyor unit to operate at variable speeds. The conveyor unit can be adjustable to facilitate controlling the direction of the material being transported via the conveyor. Some embodiments can include operating the hydraulics of the motor from the Power Take-Off ("PTO") of the truck. Some embodiments can facilitate operation of the system in a hot or other harsh environment.

18 Claims, 8 Drawing Sheets

BULK LOADER SYSTEM FOR THERMOPLASTIC PELLETS

CROSS-REFERENCE TO RELATED APPLICATIONS

This patent application is a continuation application of U.S. Ser. No. 15/830,445, filed on Dec. 4, 2017, which is related to and claims the benefit of priority to U.S. provisional patent application 62/430,467 filed on Dec. 6, 2016, wherein the entire contents of each is incorporated herein by reference.

BACKGROUND OF THE INVENTION

Field of the Invention

Various embodiments can include a bulk loader system that may be configured to be portable, and may be further configured to minimize the area foot-print it occupies.

Background of the Related Art

Bulk loading techniques can be used with many processing systems, which may include batch processing, continuous processing, etc. For example, bulk loading can be used to transfer material from a staging area or a storage unit to the processing stream of the processing system. Some processing systems may be configured to be transported as the material is being processed. Yet, conventional bulk loading techniques may not be portable, or at least adapted to be transported with the processing system. In addition, conventional bulk loading techniques may not be able to operate within close proximity to the processing system. These and other deficiencies with conventional techniques can hinder the portability and other aspects of the bulk loading system and/or the processing system the bulk loading system is associated with.

The present invention is directed toward overcoming one or more of the above-identified problems.

BRIEF SUMMARY OF THE INVENTION

Embodiments of the system can include a conveyor unit in connection with a portable hopper. The hopper can include a means for transporting it, which may include transporting the hopper to and from a trailer of a vehicle. The conveyor can include a variable speed motor unit. The motor unit may also be configured to withstand harsh environmental conditions at or near a processing unit. The conveyor unit can be configured to transport material from the hopper to the processing unit with the hopper being in close proximity to the processing unit. The conveyor can be pivoted and a directional chute of the conveyor can be adjusted to facilitate positioning and repositioning components of the system. In some embodiments, the system can be configured to be placed on a trailer of a vehicle so as to occupy only a portion of the trailer. The system can be further configured to allow an operator to also be positioned on the trailer. This may allow the operator to gain access to various components of the system for operation, oversight, and/or maintenance.

The system can be configured to facilitate introduction of material into the processing unit via the hopper and conveyor, as opposed to loading the material into the processing unit directly (e.g., dumping bags of material into the processing unit). Direct loading of the material into the processing unit can be dangerous and inefficient. Further, direct loading methods may not provide a means to effectively control a rate at which material is introduced into the processing unit.

In an exemplary embodiment, a bulk loading system can include at least one hopper having a cavity configured to receive material. The system can further include least one conveyor having a take-up end and a discharge end. The at least one conveyor may be connected to a portion of the at least one hopper that is within the cavity. The at least one conveyor may be connected to the hopper via the take-up end. The system may further include a support base affixed to the at least one hopper. The support base may be configured to facilitate the at least one hopper to be rested upon a surface and to facilitate hoisting the at least one hopper. The system may further include at least one conveyor motor disposed at or near the discharge end. The at least one motor may be configured to operate the conveyor.

In some embodiments, the at least one conveyor can be pivotally connected to the at least one hopper via a pivot connection. In some embodiments, the at least one conveyor can be pivoted from a forward position to a rearward position via the pivot connection.

The system can further include a chute surrounding the conveyor. The system can further include a chute extension connected to the chute. The chute extension may include a chute trough. In some embodiments, the chute extension can be rotatingly attached to the chute via a rotating engagement.

In some embodiments, the at least one conveyor motor can be configured to provide variable speed control for the conveyor. In some embodiments, the at least one conveyor motor can be configured to operate within an environment that exposes the at least one motor to a temperature range from 400 degrees Fahrenheit ("° F.") to 500° F.

The system can further include a pivot connector to pivotally connect the at least one conveyor to the at least one hopper, and a chute extension rotatingly connected to a chute surrounding the conveyor via a rotating engagement.

The system can further include a pivot motor in connection with the pivot connector and a rotating engagement motor in connection with the rotating engagement.

The system can further include a control module in connection with the at least one conveyor motor, the pivot motor, and/or the rotating motor to facilitate operational control of the at least one conveyor, the pivot connector, and/or the rotating engagement.

In some embodiments, the support base can be further configured to facilitate placing the at least one hopper on a trailer of a vehicle. In some embodiments, the support base can be configured to facilitate placing the at least one hopper adjacent a processing unit that is located on a trailer of a vehicle. In some embodiments, the support base can be further configured to facilitate placing two hoppers adjacent each other so as to span a width of the trailer. In some embodiments, the support base can be further configured to facilitate placing the two hoppers adjacent each other so as to span the width of the trailer with a gap between each hopper, wherein width of the trailer is approximately 96 inches and the gap is approximately 16 inches.

In another exemplary embodiment, a bulk loading system can include at least one hopper having a cavity configured to receive material. The system can further include at least one conveyor having a take-up end and a discharge end. The conveyor may be connected to a portion of the at least one hopper that is within the cavity. The at least one conveyor may be connected to the hopper via the take-up end. The system can further include a support base affixed to the at least one hopper. The support base may be configured to facilitate the at least one hopper to be rested upon a surface and to facilitate hoisting the at least one hopper. The system can further include at least one conveyor motor disposed at or near the discharge end. The at least one motor may be configured to operate the conveyor. The system can further include at least one processing unit configured to receive material from the discharge end.

In some embodiments, the system can be configured to be placed on a trailer of a vehicle. In some embodiments, the at least one hopper can include a first hopper and a second hopper. The at least one processing unit can include a first processing unit and a second processing unit. The first hopper may be configured to supply material to the first processing unit. The second hopper may be configured to supply material to the second processing unit. In some embodiments, the at least one conveyor motor can be configured to operate within an environment that exposes the at least one motor to a temperature range from 400° F. to 500° F.

In another exemplary embodiment, a method of bulk loading can include transporting at least one hopper to a location adjacent at least one processing unit. The at least one hopper may have a conveyor attached to a portion thereof. The conveyor may include a take-up end and a discharge end. The discharge end may have a conveyor motor disposed therein to operate the conveyor. The discharge end may also include a chute extension. The method can further include positioning the at least one hopper and/or the conveyor so that the discharge end can be at or near an opening of the at least one processing unit. The method can further include loading the at least one hopper with material. The method can further include operating the conveyor motor to cause the material to be transported from the take-up end toward the discharge end. The method can further include operating the conveyor motor to further cause the material to be discharged from the discharge end. The method can further include positioning the conveyor and/or the chute extension to direct the material being discharged from the discharge end toward or into the at least one processing unit. The method can further include further loading the at least one hopper on a continuous and/or batch basis as the conveyer supplies material to the at least one processing unit on a continuous basis.

Further features, aspects, objects, advantages, and possible applications of the present invention will become apparent from a study of the exemplary embodiments and examples described below, in combination with the Figures, and the appended claims.

BRIEF DESCRIPTION OF THE FIGURES

The above and other objects, aspects, features, advantages and possible applications of the present invention will be more apparent from the following more particular description thereof, presented in conjunction with the following drawings, in which.

DETAILED DESCRIPTION OF THE INVENTION

The following description is of an embodiment presently contemplated for carrying out the present invention. This description is not to be taken in a limiting sense, but is made merely for the purpose of describing the general principles and features of the present invention. The scope of the present invention should be determined with reference to the claims.

Figure 1A:
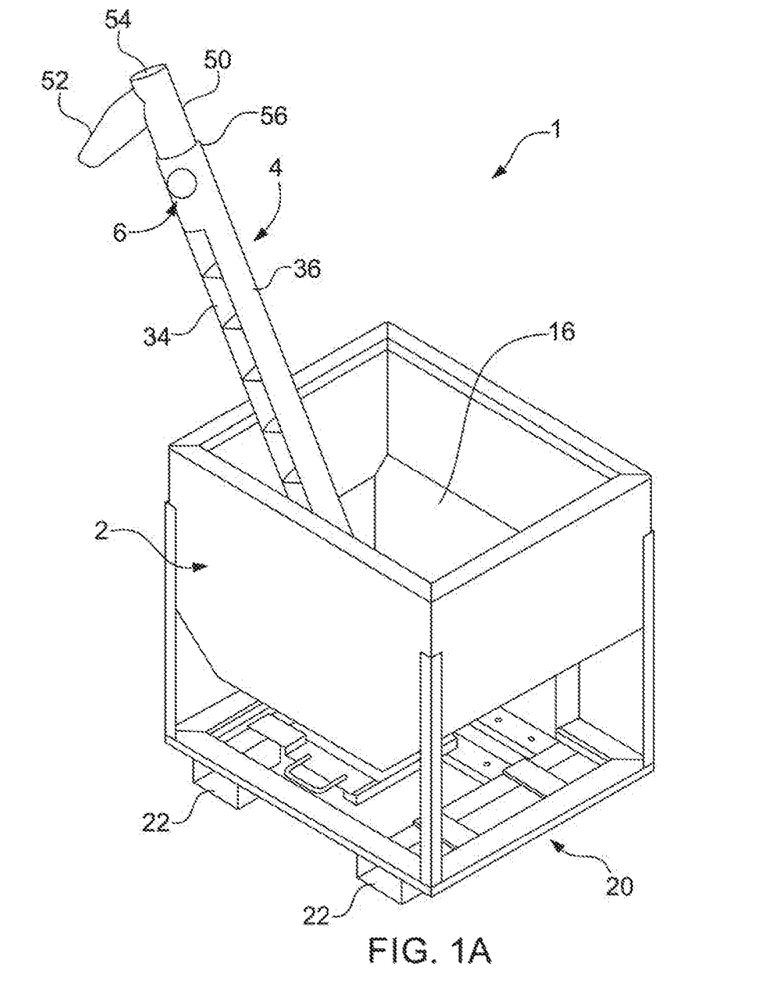
FIG. 1A shows a perspective view of an embodiment of a hopper that may be used with an embodiment of the bulk loading system.
Figure 1B:
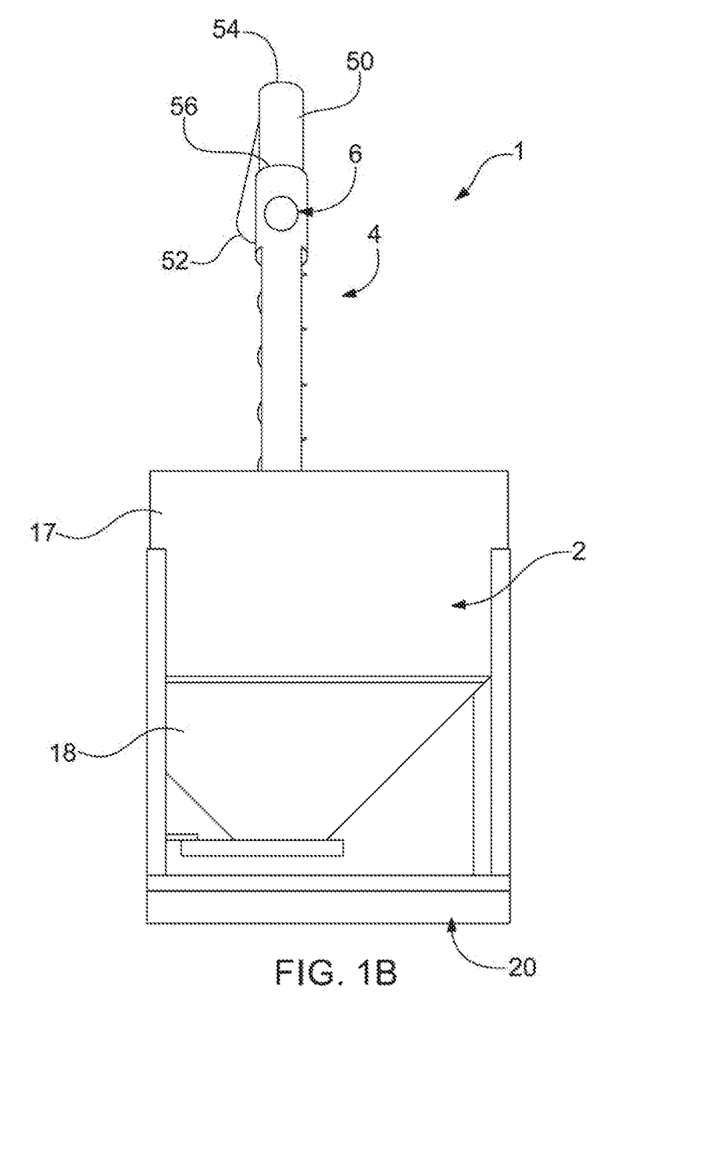
FIG. 1B shows a rear view of an embodiment of a hopper that may be used with an embodiment of the bulk loading system.
Figure 1C:
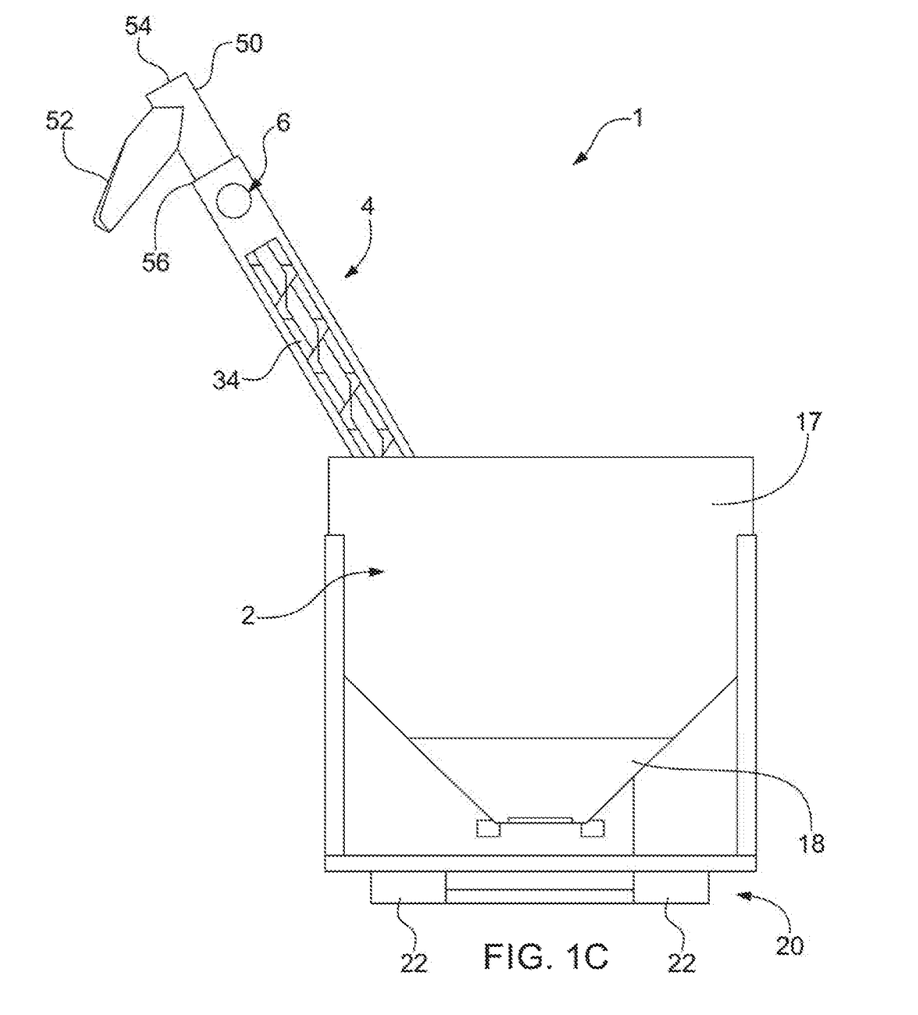
FIG. 1C shows a side view of an embodiment of a hopper that may be used with an embodiment of the bulk loading system.

Referring to FIGS. 1A-1C, the system 1 can include at least one hopper 2, at least one conveyor 4, and/or at least one motor 6. The hopper 2 can be configured to receive material, such as iron pellets, thermoplastic pellets, feed, or other bulk material. The hopper 2 can be used as a temporary storage container for the material. This can include creating a reservoir for the material as the material awaits being processed. The conveyor 4 can be configured to transport the material from the hopper 2. This can include transporting the material to another device. The motor 6 can be configured to operate the conveyor 4. This can include controlling the speed with which the conveyor 4 operates. The system 1 may further include at least one processing unit 8. (See FIGS. 5A-5B). The processing unit 8 can be configured to process the material. For example, the conveyor 4 can transport the material from the hopper 2 to the processing unit 8.

The hopper 2 can be structured as a container to hold the material within a cavity portion 16 of the hopper 2. The hopper 2 can also be structured to hold the conveyor 4. This can include retaining a take-up end 14 of the conveyor 4 within the cavity portion 16. The hopper 2 can have various shapes and sizes. In at least one embodiment, the hopper 2 can have a body 17 with a square profile and a tapered bottom 18. The hopper 2 can further include a support base 20. The support base 20 can be configured to allow the hopper 2 to rest upon a surface. In one embodiment, the support base 20 can be further structured to support the hopper 2 in an elevated manner (e.g., elevated with respect to the surface upon which the support base 20 is resting upon). The support base 20 can be structured as a palletized base. This can include at least one feed-through 22. The feed-through 22 can be structured to allow for ingress and egress of at least one forklift tine. This can facilitate use of the forklift to move and manipulate the hopper 2.

Figure 5A:
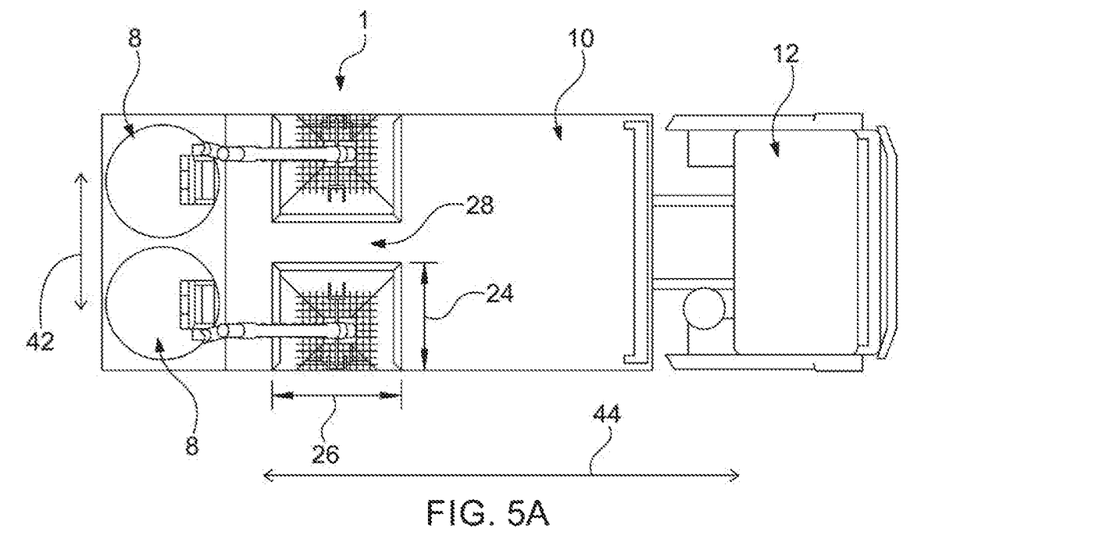
FIG. 5A shows a top view of an embodiment of the bulk loading system with an embodiment of a processing unit attached to a trailer.
Figure 5B:
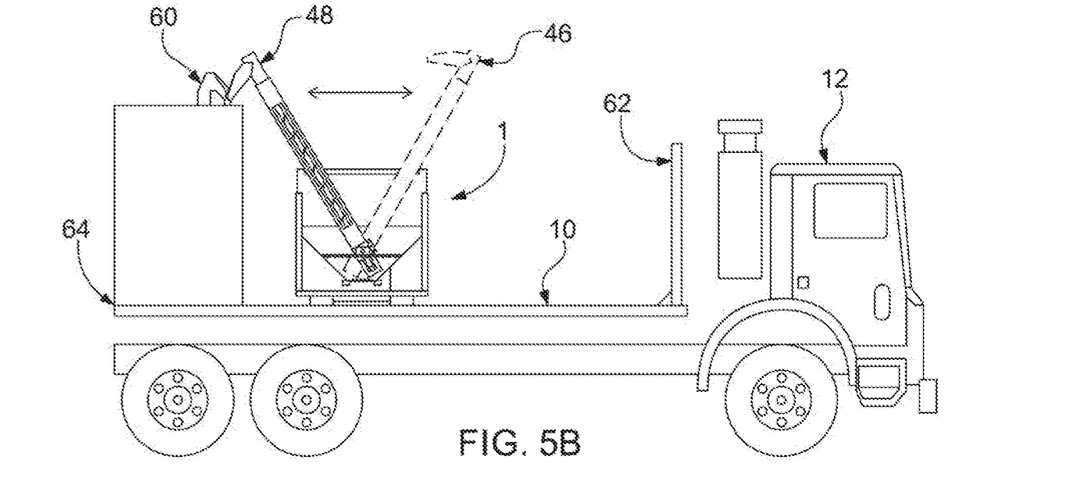
FIG. 5B shows a side view of an embodiment of the bulk loading system with an embodiment of a processing unit attached to a trailer.

Referring to FIGS. 5A-5B, in some embodiments, the system 1 can be configured to be portable. For example, the system 1 may be placed on a trailer 10 of a vehicle 12. The trailer 10 can be a flatbed trailer. In at least one embodiment, the system 1 can be transportable via a crane, a forklift, or some other hoisting mechanism. For example, the palletized base 22 can be used to transport the hopper 2 via a forklift, which may include placing the hopper 2 on, and removing it from, the trailer 10. In some embodiments, the system 1 can be configured to only occupy a portion of the trailer 10. This can include being placed on the trailer 10 and having ample room to allow at least one operator (e.g., a human) to also be on the trailer 10. In addition, the configuration of the system 1 components and particular operation thereof can facilitate each component being in close proximity with each other. This can include the motor 6 being in close proximity with the processing unit 8. This may be beneficial when configuring the system 1 with a reduced or minimized area foot-print.

In some embodiments, the system 1 can include a plurality of hoppers 2. In at least one embodiment, the hopper 2 can have a rectangular profile with a short-side length 24 of approximately 40 inches and a long-side length 26 of approximately 48 inches. These dimensions may facilitate generating a system 1 with two hoppers 2 juxtaposed to each other along a width of the trailer 10. In one embodiment, two hoppers 2 can be placed adjacent each other so that the system 1 spans the width of the trailer 10 but with a gap 28 existing between each hopper 2. The gap 28 can be wide enough to allow an operator to be positioned therein. This may allow an operator to gain access to desired components of the system 1. For example, the trailer wide may be approximately 96 inches. The short-side length 24 of approximately 40 inches can allow for a gap 28 of 16 inches. It should be noted that these dimensions are exemplary and that any dimensions can be used to achieve a desired functionality.

Figure 2A:
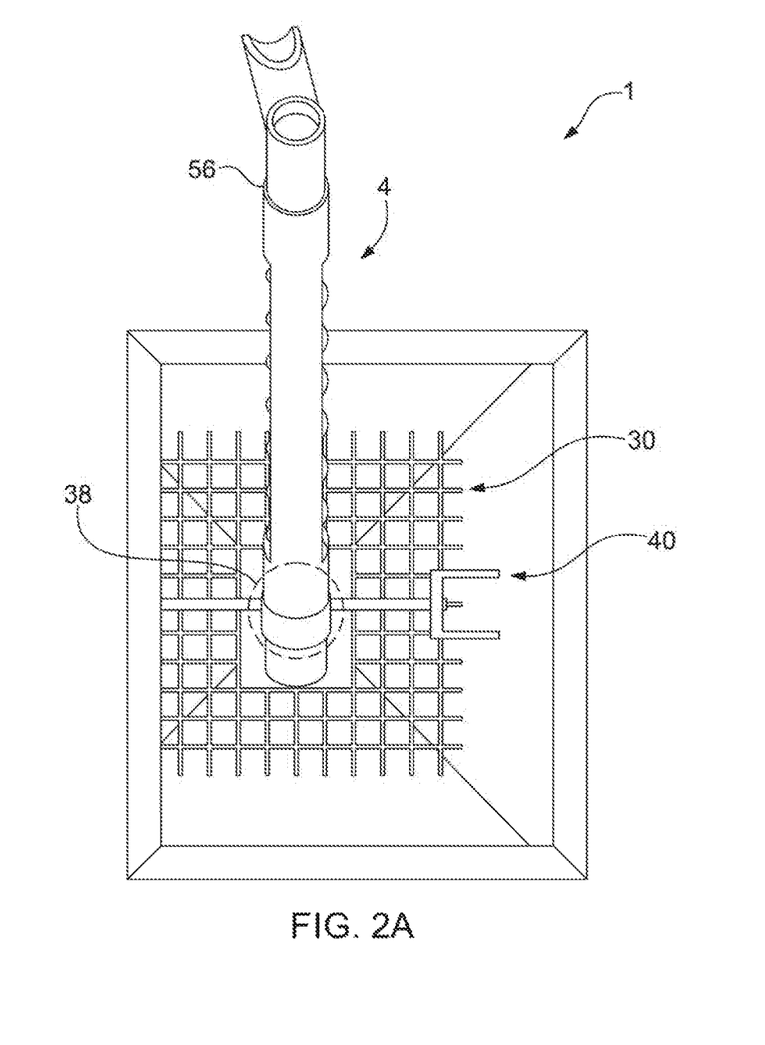
FIG. 2A shows a top view of an embodiment of a hopper that may be used with an embodiment of the bulk loading system.
Figure 2B:
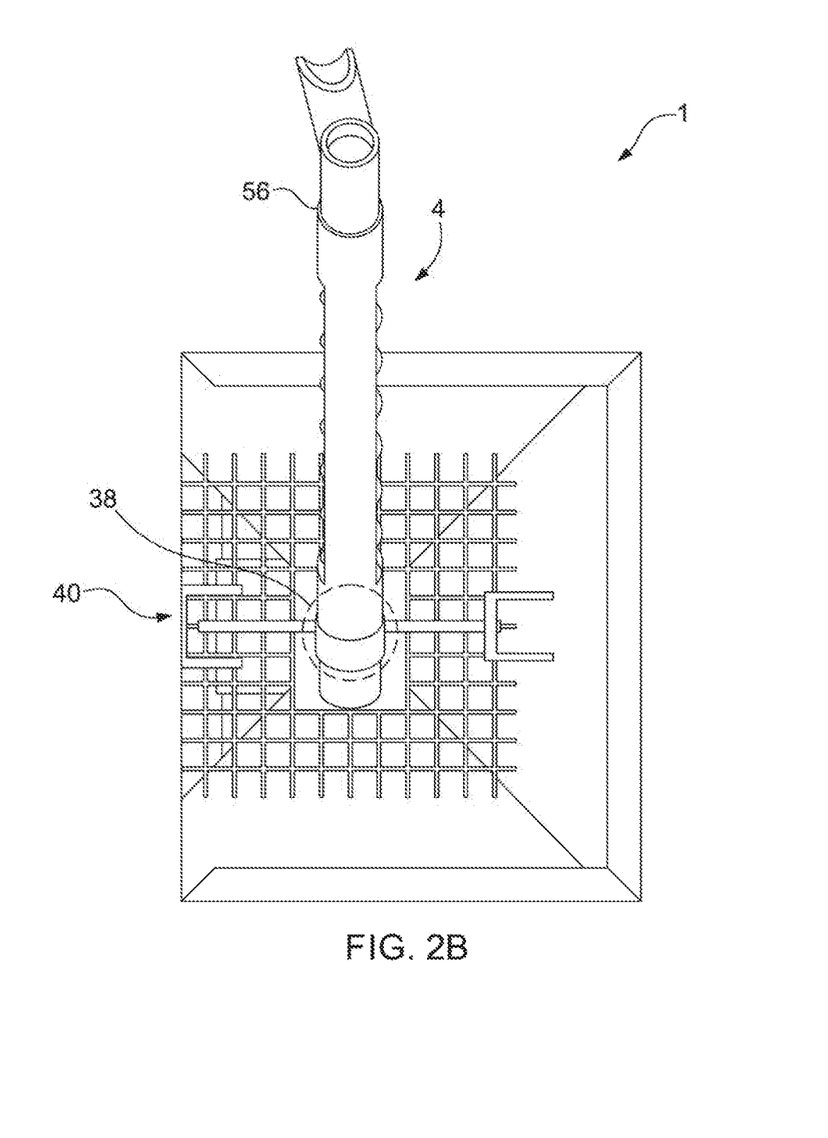
FIG. 2B shows another a top view of an embodiment of a hopper that may be used with an embodiment of the bulk loading system.
Figure 3:
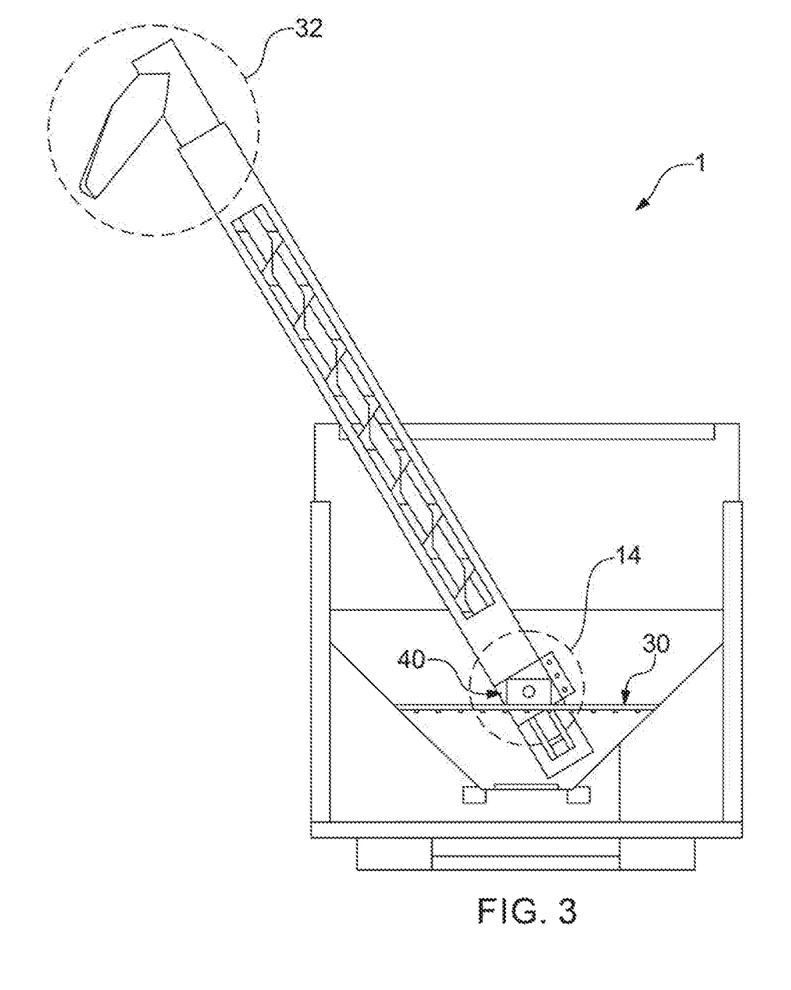
FIG. 3 shows a cross-sectional view of an embodiment of a hopper that may be used with an embodiment of the bulk loading system.

Referring to FIGS. 2-3, the cavity 16 of the hopper 2 can be configured to receive a sack or bag of material. Alternatively, the material can be placed within the cavity 16 of the hopper 2 without the bag. The hopper 2 may further include a grate 30. The grate 30 can be used to prevent certain size objects from entering the take-up end 14 of the conveyor 4. For example, the grate 30 can prevent the bag from being entrained within the conveyor 4 by preventing the bag from passing through the grate 30 and entering the take-up end 14, but allow the material of the bag to pass through the grate 30 once the bag is opened and be entrained within the conveyor 4. Being entrained within the conveyor 4 can allow the material to be transported from the take-up end 14 and be directed toward the discharge end 32.

The conveyor 4 can include a take-up end 14 and a discharge end 32. The conveyor 4 can be a belt fed unit, a screw-fed unit, etc. In at least one embodiment, the conveyor 4 is a screw-feed unit. For example, a feed-screw 34 can be configured to entrain material from the hopper 2 and transport it toward the discharge end 32. The conveyor 4 can further include a chute 36. The chute 36 may at least partially surround the conveyor 4. This may be done to confine the material to the conveyor 4 as the material is caused to be transported from the take-up end 14 toward the discharge end 32.

The conveyer 4 can be attached to the hopper 4 via its take-up end 14. For example, the conveyor take-up end 14 can be secured to a portion of the hopper 2. This can include securing the take-up end 14 to a portion of the hopper 2 that is within the cavity 16. This can further include securing the take-up end 14 below the grate 30. For example, the grate 30 can be positioned to span an inside space of the hopper 2 but have a grate aperture 38 through which the conveyor 4 can extend through. The grate aperture 38 can be configured to allow edges of the grate defined by the grate aperture 38 to hug or be adjacent the at least a portion of the chute 36.

The conveyor 4 can further include at least one pivot connector 40. The pivot connector 40 can be a pivoting joint configured to allow the conveyor 4 to pivot relative to the hopper 2. For example, the take-up end 14 can be secured to the hopper 2 via the pivot connector 40. The pivot connector 40 can be positioned above the grate 30 and the mouth of the take-up end 14 can be positioned below the grate 30. The pivot connector 40 can be a shaft with a rotating hub and bearing assembly to allow the conveyor 4 to rotate about the axis defined by the shaft. For example, the shaft can be orientated to be parallel with a latitudinal direction 42 of the trailer 10. Pivoting the conveyor 4 about the axis of the shaft can cause the conveyor 4 to swing from to and for a forward position 46 and a rearward position 48 along the longitudinal direction 44 of the trailer 10. It should be noted that the shaft can be orientated in any direction so as to allow the conveyor 4 to pivot along any direction. Further, other types of pivoting connectors 40 can be used.

The discharge end 32 of the conveyor 4 can be configured to discharge the material to another device or area as the conveyor 4 transports the material from take-up end 14. This can include discharging the material to the processing unit 8. The discharge end 32 can further include a chute extension 50. The chute extension 50 may include a chute trough 52. The chute extension 50 may extend from the chute 36 and terminate at a closed-off end 54. The chute trough 52 can extend from a side surface of the chute extension 50. As material is caused to be transported from the take-up end 14, the material can be forced against the closed-off end 54. The material can be further forced to exit the chute extension 50 via the chute trough 52. In at least one embodiment, the chute trough 52 can be duck-bill shaped. Other chute trough 52 shapes can be used.

The chute extension 50 can be rotatingly attached to the discharge end 32 via a rotating engagement 56. This can include being rotatingly attached to the chute 36 at the discharge end 32. The rotating engagement 56 can be achieved via a bearing and race assembly, for example. Other rotating engagements 56 can be used.

Figure 4:
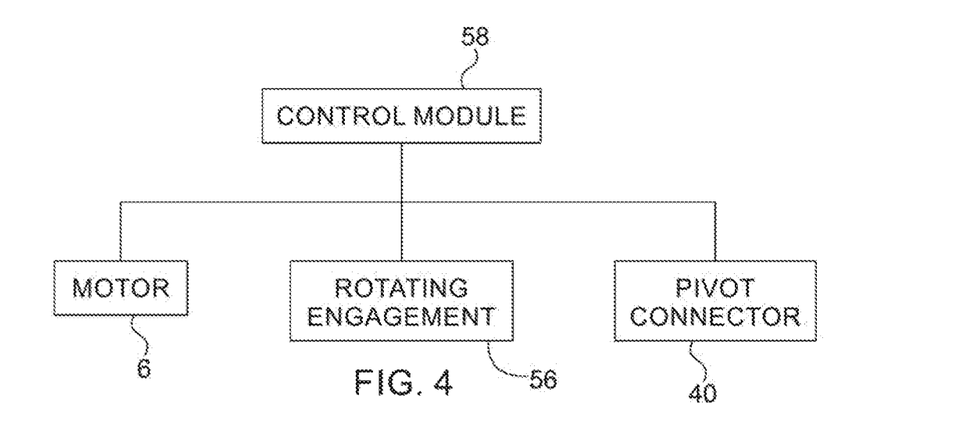
FIG. 4 shows a block diagram showing an exemplary connection between a control module and other components of an embodiment of the bulk loading system.

Referring to FIG. 4, the pivot connector 40 and/or the rotating engagement 56 can be operated manually (e.g., the operator can swing the conveyor 4 about the pivot connector 40 or rotate the chute extension 50 about the chute distal end). The pivot connector 40 and/or the rotating engagement 56 can be operated via automation (e.g., an electric motor can be used to cause the conveyor 4 to swing about the pivot connector 40 or cause the chute extension 50 to rotate about the chute distal end). The motor(s) used to operate the pivot connector 40 and/or the rotating engagement 56 can be operated via a control module 58. The control module 58 can be a processor associated with a non-transitory memory. Software can be stored within the memory to cause the processor to execute instructions that control an operation of the motor(s). The control module 58 can be connected to the pivot connector 40 and/or the rotating engagement 56 via a hardwire connection and/or via a wireless connection (e.g., at least one transceiver unit). Thus, an operator can operate the pivot connector 40 and/or the rotating engagement 56 remotely via the control module 58. In some embodiments, any of the motors can be variable speed motors.

The system 1 can further include the motor 6 to operate the conveyor 4. The motor 6 can be located at or near the discharge end 32 of the conveyor 4. This may be done to provide ease of maintenance if the motor 6 requires service.

For example, an operator can stand in the gap 26 and easily access the motor 6. With an embodiment where the conveyor 4 is configured as a screw-fed, the motor 6 can be in mechanical connection with the feed-screw 34 to cause the feed-screw 34 to rotate. This can be achieved by a drive shaft of the motor 6 being connected to a drive shaft of the feed-screw 34 via a U-joint, for example. Other types of mechanical connections can be used. In some embodiments, the control module 56 can be in further connection with the motor 6 so as to allow an operator to control the operation of the conveyor 4.

In at least one embodiment, the motor 6 can be a hydraulic motor powered by an engine. The engine can be a combustion engine, such as a gasoline engine for example. Such a configuration may allow the feed-screw 34 to be operated at variable rotational speeds. Thus, the combined hydraulic motor and engine unit can be used to form a hydraulic drive system. For example, the throttle of the engine can be used to control the operational output characteristics of the hydraulic motor to cause the feed-screw to rotate at a desired speed. In at least one embodiment, the feed-screw 34 can be operated by the Power-Take-Off ("PTO") of a vehicle 12. This can include the PTO of the vehicle 12 the system 1 is placed on.

Referring to FIGS. 5A-5B, the system 1 can further include the processing unit 8 to receive the material as it is discharged from the conveyor 4. The processing unit 8 can be a kettle used to heat the material to a desired temperature for further processing and/or use. For example, the processing unit 8 can be a kettle used to heat the thermoplastic pellets to a desired temperature before being utilized. The temperature within a close proximity around the kettle may be within a range of 400° F. to 500° F. Some embodiments include the motor 6 being located at or near the discharge end 32 of the conveyor 4. The system 1 may be configured such that the discharge end 32, and thus the motor 6, can be positioned adjacent the kettle. For example, the kettle may be a container with an opening 60. The discharge end 32 of the conveyor can be pivoted to the rearward position 48. This may cause the discharge end 32, and thus the motor 6, to be adjacent the opening 60. This may cause the motor 6 to be exposed to the temperature range from 400° F. to 500° F. Thus, the motor 6 may be configured to withstand such temperature range.

In some embodiments, the processing unit 8 can be structured to be placed on the trailer 10. The processing unit 8 can be a cylindrical shaped drum with a diameter within the range from 40 inches to 50 inches and a height of approximately 13 feet. It should be noted that these dimensions are exemplary and that any dimensions can be used to achieve a desired functionality. The trailer 10 can have a forward 62 and an aft 64. The processing unit 8 can be positioned at or near the aft 64. The hopper 2 can be positioned adjacent the processing unit 8. This can include being placed in front of the processing unit 8. The hopper 2 can be positioned adjacent the processing unit 8 such that the discharge end 32 of the conveyor 4 can be pivoted to the full rearward position 48. In the full rearward position 48, a vertical distance from a top surface of the trailer 10 to a distal end of the chute extension 50 can be 13 feet and 6 inches. This requirement may be used to accommodate road conditions, such as allowing the vehicle 12 to travel through under-passes and other overhead structures. Other spatial requirements can be applied. With the non-limiting exemplary dimensions and configurations described above, the system 1 can be placed on a portion of the trailer 10 with ample room for other equipment. For example the system 1 may only take up approximately half of the trailer 10. Further, as noted above, the system 1 can include two hoppers 2 with ample room for an operator to be positioned within the gap 28 between them. Thus, configuration and placement of the system 1 components can be used to reduce the area footprint of the system 1.

In some embodiments, system can include a plurality of processing units 8. For example, two processing units 8 can be placed adjacent each other so that the processing units 8 span the width of the trailer 10. Each processing unit 8 can be associated with a hopper 2. For example, a first hopper 2 can be positioned adjacent a first processing unit 8 and a second hopper 2 can be positioned adjacent a second processing unit 8. The conveyor 4 of the first hopper 2 can be configured to supply material from the first hopper 2 to the first processing unit 8. The conveyor 4 of the second hopper 2 can be configured to supply material from the second hopper 2 to the second processing unit 8. Alternately, the system 1 can include a plurality of processing units 8 and a single hopper 2. Alternatively, the system 1 can include a plurality of hoppers 2 and a single processing unit 8. The various configurations may be used to facilitate material processing via a semi-continuous process. For example, the material can be loaded into the hopper(s) 2 batch-wise while the conveyor(s) 4 from the hopper(s) 2 can supply the material to the processing unit(s) 8 on a continuous basis. The various configurations may also be used to supply a first type of material from a first hopper 2 and a second type of material form a second hopper 2. The variable speed operation of the conveyor 4 can further facilitate concerted coordination of feed-rates from each hopper 2.

With the motor 6 positioned at or near the discharge end 32 of the conveyor 4, the ability to rotate the discharge end 32, the ability to pivot the pivot connector 14, the ability to reposition and reconfigure the system 1 components, and/or the ability to control the feed-rate, can allow the system 1 to be used anywhere, whether the processing unit 8 is stationary or whether the processing unit 8 is mobile. Further, the system 1 can be configured to be used in various compromising spaces due to the ability to configure and reconfigure the system 1 components. Thus, the system 1 is not limited to being used on a trailer 10 of the vehicle 12. The ability to transport the hopper 2 (e.g., via the palletized base 20) can further facilitate portability of the system 1. Thus, the system 1 can be transported, configured, and reconfigured in a multitude of ways to achieve a desired operation and functionality. The ability to pivot the conveyor 4 to and from the forward position 46 and rearward position 48 can allow the system 1 to discharge material from either position. Additionally, the ability to rotate the chute extension 50 can allow an operator to fine tune the direction the material can be discharged. Such functionalities can further facilitate ease of transport, configuration, and reconfiguration for the system 1.

In an exemplary implementation, the system 1 can be used by transporting at least one hopper 2 to a desired location. This can include hoisting the hopper 2 via the feed-throughs 22 with use of a forklift. The hopper 2 can be placed adjacent to at least one processing unit 8. The processing unit 8 may be positioned on a trailer 10, and the hopper 2 may also be placed on the trailer 10. This can include placing the hopper 2 adjacent the processing unit 8.

At least one material can be loaded into the cavity 16 portion of the hopper 2. The material can be loaded by placing a bag or sack filled with the material into the hopper 2. The bag can be opened to allow the material to flow into the take-up end 14 of the conveyor 4. Alternatively, or in addition, the material can be loaded into the hopper 2 without a bag or sack. The motor 6 can be actuated to cause the conveyor 4 to transport the material from the take-up end 14 and toward the discharge end 32. The material can be further caused to be discharged from the discharge end 32. Discharging the material can include directing the material toward or into the processing unit 8.

The conveyor 4 can be pivoted to the forward position 46 and/or the rearward position 48. This can be done before, during, and/or after the material is loaded into the hopper 2. This can also be done before, during, and/or after the material is being discharged from the discharge end 32. In some embodiments, the conveyor 4 can be pivoted such that the discharge end 32 is positioned adjacent the processing unit 8. The conveyor 4 can include the chute extension 50. The chute extension 50 can be rotated to further direct the material being discharged from the discharge end 32. This can be done before, during, and/or after the material is loaded into the hopper 2. This can also be done before, during, and/or after the material is being discharged from the discharge end 32. Further directing the material can include causing the material being discharged to be directed toward or into the processing unit 8.

The system 1 can be used to transport material from the hopper 2 to the processing unit 8 in a continuous process while material is loaded into the hopper 2 in a batch-loading process and/or a continuous process. The feed-rate of the material from the hopper 2 to the processing unit 8 can be controlled via the variable speed control of the motor 6. The variable speed control of the motor 6 can be controlled via the control module 58. In addition, at least one motor can be associated with the pivot connector 40 and/or rotating engagement 56 to control the operations of each. The motor(s) of the pivot connector 40 and/or rotating engagement 56 can be in further connection with the control module 58. The operations of the pivot connector 40 and/or rotating engagement 56 may then be controlled via the control module 58.

The system 1 can include a first hopper 2, a second hopper 2, a first processing unit 8, and a second processing unit 8. The first and second processing units 8 can be positioned on the trailer 10 adjacent each other so as to span a width of the trailer 10. The first and second processing units 8 can be positioned at or near the aft 64 of the trailer 10. The first and second hoppers 2 can be positioned on the trailer 10 adjacent each other so as to span a width of the trailer 10 but for the gap 28 between the hoppers 2. The gap 28 can be wide enough to allow an operator to be positioned therein. The first hopper 2 can be positioned adjacent the first processing unit 8. For example, the first hopper 2 can be placed in front of the first processing unit 8. The second hopper 2 can be positioned adjacent the second processing unit 8. For example, the second hopper 2 can be placed in front of the second processing unit 8. The conveyor 4 of the first hopper 2 can be pivoted to the rearward position 48. This can include positioning the discharge end 32 of the conveyor 4 adjacent the opening 60 of the first processing unit 8. The chute extension 50 of the conveyor can be rotated to direct material that may be discharged from the conveyor into the opening 60 of the first processing unit 8. The motor 6 can be actuated to cause the conveyor 4 to transport the material from the first hopper 2 to the first processing unit 8. The motor 6 speed control can be adjusted to control the feed-rate. The conveyor 4 of the second hopper 2 can be pivoted to the rearward position 48. This can include positioning the discharge end 32 of the conveyor 4 adjacent the opening 60 of the second processing unit 8. The chute extension 50 of the conveyor can be rotated to direct material that may be discharged from the conveyor into the opening 60 of the second processing unit 8. The motor 6 can be actuated to cause the conveyor 4 to transport the material from the second hopper 2 to the second processing unit 8. The motor 6 speed control can be adjusted to control the feed-rate.

The position of the hopper(s) 2, the position of the conveyor(s) 4, the orientation of the chute extension(s) 50, and/or the feed-rates of the conveyor(s) 4 can be further adjusted to provide a desired system 1 configuration and/or operational functionality. For example, the first and second processing units 8 and the first and second hoppers 2 can be positioned to occupy approximately half of the trailer 10 of the vehicle 12.

In at least one embodiment, the un-occupied space of the trailer 10 can be used as a staging area to hold the material or bags of material before being loaded into the hopper 2. Alternatively, or in addition, another vehicle 12 (e.g., a nurse truck) with a trailer 10 can be used as the staging area.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the endpoints.

What is claimed is:

1. A bulk loading system, comprising:
    at least one hopper having a cavity configured to receive material;
    a pivot connector positioned within the cavity of the at least one hopper, the pivot connector comprising a shaft and a pivot motor; and
    a support base affixed to the at least one hopper, the support base being configured to facilitate the at least one hopper to be rested upon a surface and to facilitate hoisting the at least one hopper.

2. The bulk loading system recited in claim 1, further comprising:
    at least one conveyor having a take-up end and a discharge end, the at least one conveyor being connected to the pivot connector.

3. The bulk loading system recited in claim 2, wherein the at least one conveyor is connected to the pivot connector via the take-up end.

4. The bulk loading system recited in claim 1, further comprising a chute surrounding the conveyor.

5. The bulk loading system recited in claim 3, further comprising a chute extension connected to the chute.

6. The bulk loading system recited in claim 5, further comprising a chute trough connected to the chute extension.

7. The bulk loading system recited in claim 6, wherein the chute extension is rotatably attached to the chute via a rotating engagement.

8. The bulk loading system recited in claim 2, further comprising at least one conveyor motor that is configured to provide variable speed control for the at least one conveyor.

9. The bulk loading system recited in claim 8, wherein the at least one conveyor motor is configured to operate within an environment that exposes the at least one conveyor motor to a temperature range from 400° F. to 500° F.

10. The bulk loading system recited in claim 1, wherein the support base is further configured to facilitate placing the at least one hopper on a trailer of a vehicle.

11. The bulk loading system recited in claim 10, wherein the support base is configured to facilitate placing the at least one hopper adjacent a processing unit that is located on a trailer of a vehicle.

12. The bulk loading system recited in claim 10, wherein the support base is further configured to facilitate placing two hoppers adjacent each other so as to span a width of the trailer.

13. The bulk loading system recited in claim 12, wherein the support base is further configured to facilitate placing the two hoppers adjacent each other so as to span the width of the trailer with a gap between each hopper, wherein the width of the trailer is approximately 96 inches and the gap is approximately 16 inches.

14. The bulk loading system recited in claim 2, further comprising at least one processing unit configured to receive material from the discharge end.

15. The bulk loading system recited in claim 14, wherein the system is configured to be placed on a trailer of a vehicle.

16. The bulk loading system recited in claim 14, wherein:

the at least one hopper comprises a first hopper and a second hopper;

the at least one processing unit comprises a first processing unit and a second processing unit;

the first hopper supplies material to the first processing unit, and the second hopper supplies material to the second processing unit.

17. The bulk loading system recited in claim 7, further comprising a rotating engagement motor in connection with the rotating engagement.

18. The bulk loading system recited in claim 1, further comprising a control module in connection with the pivot motor to facilitate operational control of the pivot connector.

* * * * *